(12) United States Patent
Sakamoto et al.

(10) Patent No.: US 12,149,285 B2
(45) Date of Patent: Nov. 19, 2024

(54) OPTICAL WIRELESS COMMUNICATION SYSTEM AND OPTICAL WIRELESS COMMUNICATION METHOD

(71) Applicant: NIPPON TELEGRAPH AND TELEPHONE CORPORATION, Tokyo (JP)

(72) Inventors: Kazumitsu Sakamoto, Musashino (JP); Yohei Katayama, Musashino (JP); Kento Yoshizawa, Musashino (JP); Takeshi Kinoshita, Musashino (JP); Etsushi Yamazaki, Musashino (JP); Takayuki Mizuno, Musashino (JP); Takuya Ohara, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 58 days.

(21) Appl. No.: 18/008,473

(22) PCT Filed: Jun. 12, 2020

(86) PCT No.: PCT/JP2020/023234
§ 371 (c)(1),
(2) Date: Dec. 6, 2022

(87) PCT Pub. No.: WO2021/250895
PCT Pub. Date: Dec. 16, 2021

(65) Prior Publication Data
US 2023/0208521 A1    Jun. 29, 2023

(51) Int. Cl.
*H04B 10/112*    (2013.01)
*H04B 10/079*    (2013.01)
*H04B 10/114*    (2013.01)

(52) U.S. Cl.
CPC ..... *H04B 10/1143* (2013.01); *H04B 10/0795* (2013.01); *H04B 10/1123* (2013.01)

(58) Field of Classification Search
CPC .......................................... H04B 10/112–1129
See application file for complete search history.

(56) References Cited

U.S. PATENT DOCUMENTS

2002/0196506 A1* 12/2002 Graves ............... H04B 10/1125
398/126
2007/0297805 A1* 12/2007 Rabinovich ........ H04B 10/2587
398/151

(Continued)

FOREIGN PATENT DOCUMENTS

JP    2018-121281 A    8/2018

OTHER PUBLICATIONS

G. Konesky, "Application of adaptive optics to a Moon-to-Earth optical data link," 2006 IEEE Aerospace Conference, Big Sky, MT, USA, 2006, pp. 7 pp.-, doi: 10.1109/AERO.2006.1655848 (Year: 2006).*

(Continued)

*Primary Examiner* — Nathan M Cors

(57) ABSTRACT

In an optical wireless communication system including: an optical wireless communication apparatus that moves along with a first optical wireless station; and a second optical wireless station opposed to the first optical wireless station, the optical wireless communication apparatus includes at least one reference light transmitting unit that transmits reference light to the second optical wireless station with a position in front in a moving direction of the first optical wireless station defined as a transmission position, the second optical wireless station includes a reference light receiving unit that receives the reference light transmitted from the at least one reference light transmitting unit, an estimation unit that estimates an influence of atmospheric air (Continued)

on transmission of signal light based on a reception state of the reference light received by the reference light receiving unit, a compensation unit that performs compensation processing on the signal light based on the influence of the atmospheric air estimated by the estimation unit, and a signal light transmitting unit that transmits the signal light on which the compensation processing has been performed by the compensation unit in an arrival direction of the reference light.

7 Claims, 7 Drawing Sheets

(56) References Cited

U.S. PATENT DOCUMENTS

| | | | |
|---|---|---|---|
| 2009/0202254 A1* | 8/2009 | Majumdar | G01S 17/74 398/140 |
| 2019/0372669 A1* | 12/2019 | Ziegler | H04B 10/503 |
| 2019/0393956 A1 | 12/2019 | Kolev et al. | |

OTHER PUBLICATIONS

K. Wilson, A. Biswas and J. Schoolcraft, "A study of an optical lunar surface communications network with high bandwidth direct to earth link," 2011 International Conference on Space Optical Systems and Applications (ICSOS), Santa Monica, CA, USA, 2011, pp. 299-305, doi: 10.1109/ICSOS.2011.5783687. (Year: 2011).*

J. W. Armstrong, C. Yeh, and K. E. Wilson, "Earth-to-deep-space optical communications system with adaptive tilt and scintillation correction by use of near-Earth relay mirrors," Opt. Lett. 23, 1087-1089 (1998) (Year: 1998).*

H. Hemmati, A. Biswas and I. B. Djordjevic, "Deep-Space Optical Communications: Future Perspectives and Applications," in Proceedings of the IEEE, vol. 99, No. 11, pp. 2020-2039, Nov. 2011, doi: 10.1109/JPROC.2011.2160609. (Year: 2011).*

Yongxiong Ren et al., "Adaptive-optics-based simultaneous pre- and post-turbulence compensation of multiple orbital-angular-momentum beams in a bidirectional free-space optical link", Optica, vol. 1, No. 6, Dec. 2014, pp. 376-382.

* cited by examiner

OPTICAL WIRELESS COMMUNICATION SYSTEM AND OPTICAL WIRELESS COMMUNICATION METHOD

CROSS-REFERENCE TO RELATED APPLICATIONS

This application is a 371 U.S. National Phase of International Application No. PCT/JP2020/023234, filed on Jun. 12, 2020. The entire disclosure of the above application is incorporated herein by reference.

TECHNICAL FIELD

The present disclosure relates to an optical wireless communication system and an optical wireless communication method.

BACKGROUND ART

In a case in which light is transmitted from the Earth to the moon, a wavefront of the light may be distorted due to the influence of atmospheric air of the Earth, and spatial intensity differences (speckle) may occur in the light arriving at the moon. This may lead to deterioration in a light reception level at a lunar station and thus deterioration in communication quality. Also, the spatial intensity difference pattern of the light arriving at the moon may vary with time due to the atmospheric turbulence of the Earth. Thus, the atmospheric turbulence is one of the main reasons inhibiting stable high-speed communication from the Earth to the moon.

Atmospheric turbulence compensation techniques of compensating for the influence of the atmospheric turbulence and stably securing a high light reception level have been studied. For example, in NPL 1, an optical wireless station on the Earth (hereinafter, referred to as a "transmitting station") first receives reference light transmitted from an optical wireless station outside the atmosphere (hereinafter, referred to as an "opposing station"), observes the influence of atmospheric turbulence on the reference light, and transmits, to the opposing station, signal light on which compensation processing using adaptive optics has been performed in advance based on a result of the observation, thereby stably securing a high light reception level state.

CITATION LIST

Non-Patent Literature

NPL 1: Y. Ren et al., "Adaptive-optics-based simultaneous pre- and post-turbulence compensation of multiple orbital-angular-momentum beams in a bidirectional free-space optical link," Optica, Vol. 1, No. 6, pp. 376 to 382, December 2014

SUMMARY OF THE INVENTION

Technical Problem

According to the technique described in NPL 1, the signal light transmitted after the compensation processing performed thereon in advance by the transmitting station is back-propagated in the arrival direction of the reference light. Thus, in a case in which the opposing station is present as it is at the position (transmission point) from which the reference light has been transmitted, it is possible to stably secure a high light reception level state. However, the relative position of the opposing station seen from the transmitting station may change due to movement of at least one of the transmitting station or the opposing station. For example, there is a case in which signal light is transmitted from a ground station placed on the Earth toward a lunar station placed on the moon orbiting around the Earth. In this case, the position of the lunar station at the timing when the lunar station transmits reference light to the ground station is different from the position of the lunar station at the timing when the lunar station receives the signal light transmitted from the ground station. Thus, there is a problem that it is difficult to receive the signal light at the lunar station because the lunar station has already moved from the transmission point of the reference light even when the signal light is back-propagated in the arrival direction of the reference light.

In view of the aforementioned circumstances, an object of the present disclosure is to provide an optical wireless communication system and an optical wireless communication method capable of performing stable optical wireless communication in a case in which optical wireless stations move.

Means for Solving the Problem

According to an aspect of the present disclosure, there is provided an optical wireless communication system including: an optical wireless communication apparatus that moves along with a first optical wireless station; and a second optical wireless station opposed to the first optical wireless station, the optical wireless communication apparatus including at least one reference light transmitting unit that transmits reference light to the second optical wireless station with a position in front in a moving direction of the first optical wireless station defined as a transmission position, the second optical wireless station including a reference light receiving unit that receives the reference light transmitted from the at least one reference light transmitting unit, an estimation unit that estimates an influence of atmospheric air on transmission of signal light based on a reception state of the reference light received by the reference light receiving unit, a compensation unit that performs compensation processing on the signal light based on the influence of the atmospheric air estimated by the estimation unit, and a signal light transmitting unit that transmits the signal light on which the compensation processing has been performed by the compensation unit in an arrival direction of the reference light.

According to an aspect of the present disclosure, there is provided an optical wireless communication method performed by an optical wireless communication system including an optical wireless communication apparatus that moves along with a first optical wireless station and a second optical wireless station opposed to the first optical wireless station, the method including: by the optical wireless communication apparatus, transmitting reference light to the second optical wireless station with a position in front in a moving direction of the first optical wireless station defined as a transmission position; by the second optical wireless station, receiving the reference light transmitted in the transmitting of the reference light; by the second optical wireless station, estimating an influence of atmospheric air on transmission of signal light based on a reception state of the reference light received in the receiving of the reference light; by the second optical wireless station, performing compensation processing on the signal light based on the influence of the atmospheric air estimated in the estimating of the influence; and by the second optical wireless station, transmitting the signal light on which the compensation processing has been performed in the performing of the compensation processing in an arrival direction of the reference signal.

Effects of the Invention

According to the present disclosure, it is possible to perform stable optical wireless communication in a case in which optical wireless stations move.

DESCRIPTION OF EMBODIMENTS

First Embodiment

Hereinafter, a first embodiment according to the present disclosure will be described. An optical wireless communication system 1 according to the present embodiment described below is a communication system for transmitting signal light from an optical wireless station to another optical wireless station which is moving. Also, the optical wireless communication system 1 according to the present embodiment is a communication system that compensates for an influence of atmospheric air (an influence of atmospheric turbulence, for example) on signal light to be transmitted from an optical wireless station to another optical wireless station. As one example of the present embodiment, signal light is transmitted from an optical wireless station (ground station) placed on the Earth to an optical wireless station (lunar station) placed on the moon surface. Also, an influence of atmospheric turbulence on the signal light transmitted from the ground station to the lunar station is compensated for in the present embodiment.

A wavefront of the signal light transmitted from the ground station to the lunar station may be distorted due to an influence of atmospheric turbulence of the Earth. In this case, spatial intensity difference (speckle) occurs in a light reception level of the signal light arriving at the lunar station. The spatial intensity difference pattern of the light reception level may vary with time due to the atmospheric turbulence. This may lead to deterioration in a light reception level at a lunar station and thus deterioration in communication quality.

In the optical wireless communication system 1 according to the present embodiment, the ground station receives reference light transmitted from the lunar station in advance in order to compensate for an influence of atmospheric turbulence and stably secure a high light reception level. The ground station observes an influence of atmospheric turbulence on the reference light and transmits, to the moon, signal light on which compensation processing is performed in advance based on a result of the observation. The optical wireless communication system 1 can thus stably secure a high light reception level of the signal light at the lunar station.

The optical wireless communication system 1 according to the present embodiment transmits the reference light from the lunar station to the ground station in consideration of movement of the lunar station due to revolution of the moon. Note that in the following description, a total propagation time of the reference light from the lunar station to the ground station and the signal light from the ground station to the lunar station will be referred to as a "round-trip propagation time".

Figure 1:
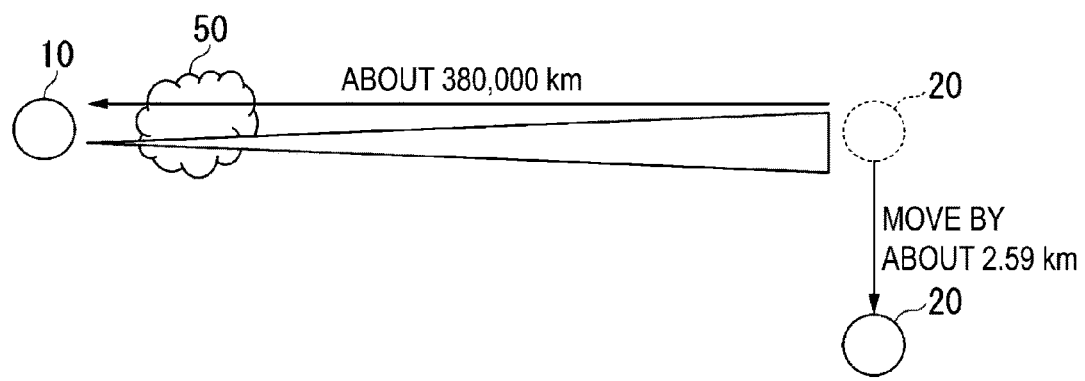
FIG. 1 is a schematic view illustrating movement of a lunar station in a round-trip propagation time.

FIG. 1 is a schematic view illustrating movement of the lunar station in the round-trip propagation time. FIG. 1 illustrates a ground station 10 and a lunar station 20. As for the lunar station 20, two lunar stations, namely the lunar station 20 depicted by a solid line circle and the lunar station 20 depicted by a dashed line are illustrated. The lunar station 20 depicted by the dashed line represents the position of the lunar station 20 at a timing when the lunar station 20 transmits the reference light to the ground station 10 (that is, a transmission point of the reference light). On the other hand, the lunar station 20 depicted by the solid line represents the position of the lunar station 20 at a timing when the signal light transmitted from the ground station 10 arrives at the transmission point of the reference light. Also, atmospheric air 50 of the Earth is present around the ground station 10, and atmospheric turbulence occurs.

The distance between the Earth and the moon is about 380,000 km. Thus, the distance between the ground station 10 and the lunar station 20 is also about 380,000 km as illustrated in FIG. 1. Light (reference light and signal light) takes about 2.53 seconds to make a round trip over a distance of about 380,000 km. In other words, the round-trip propagation time is at least about 2.53 seconds.

Note that a processing time at the ground station 10 differs depending on the system. The processing time described here is, for example, a processing time required for processing of estimating an influence of atmospheric turbulence, processing of compensating for the signal light, processing of modulating the signal light, and the like. Because the processing time at the ground station 10 and the like are added to the time for light making a round trip between the Earth and the moon, the actual round-trip propagation time is typically longer than about 2.53 seconds. However, it is assumed for simplicity that the ground station 10 transmits the signal light to the moon (in the arrival direction of the reference light) at the same time as the reception of the reference light in the present embodiment. In other words, the round-trip propagation time is assumed to be about 2.53 seconds.

Also, an orbiting speed in the revolution of the moon is about 1,023 m/s. It is possible to understand from this that the lunar station 20 moves at least about 2.59 km in the round-trip propagation time.

Figure 2:
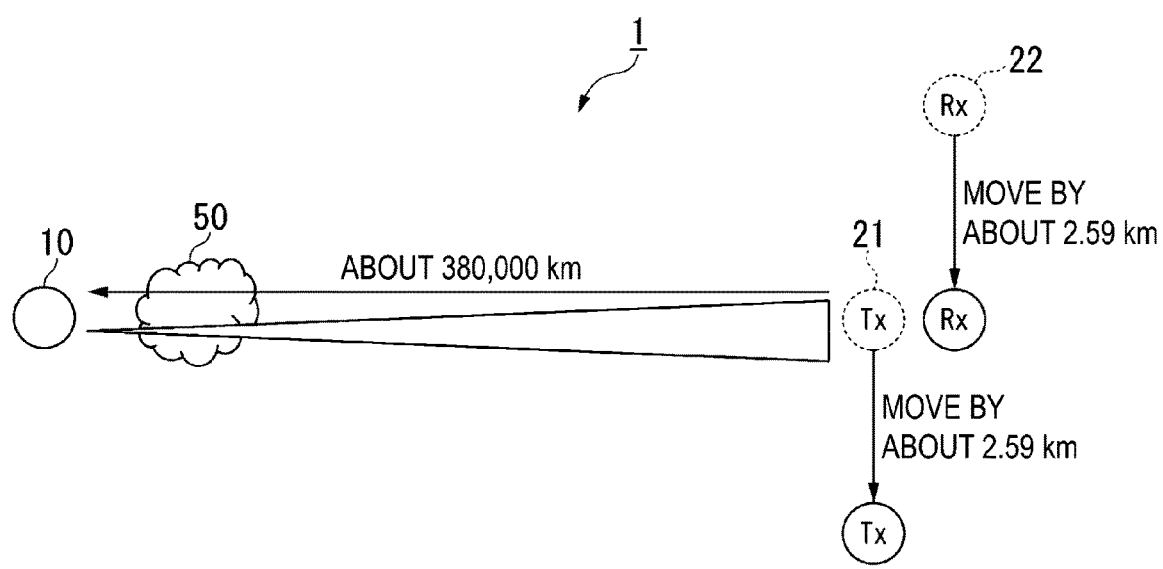
FIG. 2 is an overview configuration diagram of an optical wireless communication system 1 according to a first embodiment of the present disclosure.

FIG. 2 is an overview configuration diagram of the optical wireless communication system 1 according to the first embodiment of the present disclosure. As illustrated in FIG. 2, the optical wireless communication system 1 includes the ground station 10, a reference light transmitting lunar station 21, and a signal light receiving lunar station 22. In this manner, the lunar station for transmitting the reference light and the lunar station for receiving the signal light are separately provided in the optical wireless communication system 1 according to the present embodiment.

FIG. 2 illustrates two lunar stations, namely the reference light transmitting lunar station 21 and the signal light receiving lunar station 22 depicted by solid line circles and two lunar stations, namely the reference light transmitting lunar station 21 and the signal light receiving lunar station 22 depicted by dashed lines. The reference light transmitting lunar station 21 and the signal light receiving lunar station 22 depicted by the dashed lines represent positional relationships of the reference light transmitting lunar station 21 and the signal light receiving lunar station 22 at a timing when the reference light transmitting lunar station 21 transmits the reference light to the ground station 10. In other words, the position of the reference light transmitting lunar station 21 depicted by the dashed line is a transmission point of the reference light.

On the other hand, the reference light transmitting lunar station 21 and the signal light receiving lunar station 22 depicted by the solid lines represent the positions of the reference light transmitting lunar station 21 at the timing when the signal light transmitted from the ground station 10 arrives at the transmission point of the reference light. Also, atmospheric air 50 of the Earth is present around the ground station 10, and atmospheric turbulence occurs.

The reference light transmitting lunar station 21 is placed at about 2.59 km in front of the position where the signal light receiving lunar station 22 is placed along the traveling direction of the revolution orbit of the moon. In other words, the positional relationship between the reference light transmitting lunar station 21 and the signal light receiving lunar station 22 is defined such that the position (transmission point) of the reference light transmitting lunar station 21 at the timing when the round-trip propagation time starts is the position of the signal light receiving lunar station 22 at the timing when the round-trip propagation time ends.

Note that the actual round-trip propagation time is a time obtained by adding the processing time at the ground station 10 and the like to the time required for the light to make a round trip between the Earth and the moon as described above. Thus, the distance by which the moon moves in the round-trip propagation time is typically longer than about 2.59 km. In practice, the positional relationship between the reference light transmitting lunar station 21 and the signal light receiving lunar station 22 is defined in consideration of the processing time at the ground station 10 and the like as well.

The reference light transmitting lunar station 21 transmits the reference light to the ground station 10. A spatial intensity difference (speckle) occurs in the light reception level of the reference light at the ground station 10 due to an influence of the atmospheric turbulence of the atmospheric air 50 of the Earth on the reference light. The ground station 10 estimates the influence of the atmospheric turbulence on the reference light through observation of the received reference light. The ground station 10 performs compensation processing in advance on the signal light to be back-propagated in the arrival direction of the reference light based on the estimated influence of the atmospheric turbulence. Note that the it is possible to use any methods in the related art for processing of estimating the influence of the atmospheric turbulence and the compensation processing performed on the signal light.

The ground station 10 transmits the signal light on which the compensation processing has been performed in the arrival direction of the reference light. The signal light receiving lunar station 22 is present at the arrival point when the signal light arrives at the moon surface. As illustrated in FIG. 2, the arrival point is the same point as the transmission point at which the reference light transmitting lunar station 21 has transmitted the reference light.

In this manner, the reference light is transmitted with an expected position of the signal light receiving lunar station 22 at the timing when the signal light back-propagated in the arrival direction of the reference light arrives at the moon surface defined as the transmission point, and thus the moving reference light transmitting lunar station 21 can receive the signal light.

Moreover, although the signal light is affected by the atmospheric turbulence of the atmospheric air 50 of the Earth, the ground station 10 observes the reference light transmitted from the transmission point that is at the same position as the expected position of the signal light receiving lunar station 22 at the timing when the signal light arrives at the moon surface. Also, the ground station 10 back-propagates the signal light, on which the compensation processing has been performed in advance, in the arrival direction of the reference light based on a result of the observation of the influence of the atmospheric turbulence on the reference light. In this manner, transmission paths of the signal light and the reference light are the same, and thus it is possible to accurately perform compensation processing and stably secure a high light reception level at the signal light receiving lunar station 22.

Functional Configurations of Optical Wireless Communication System

Figure 3:
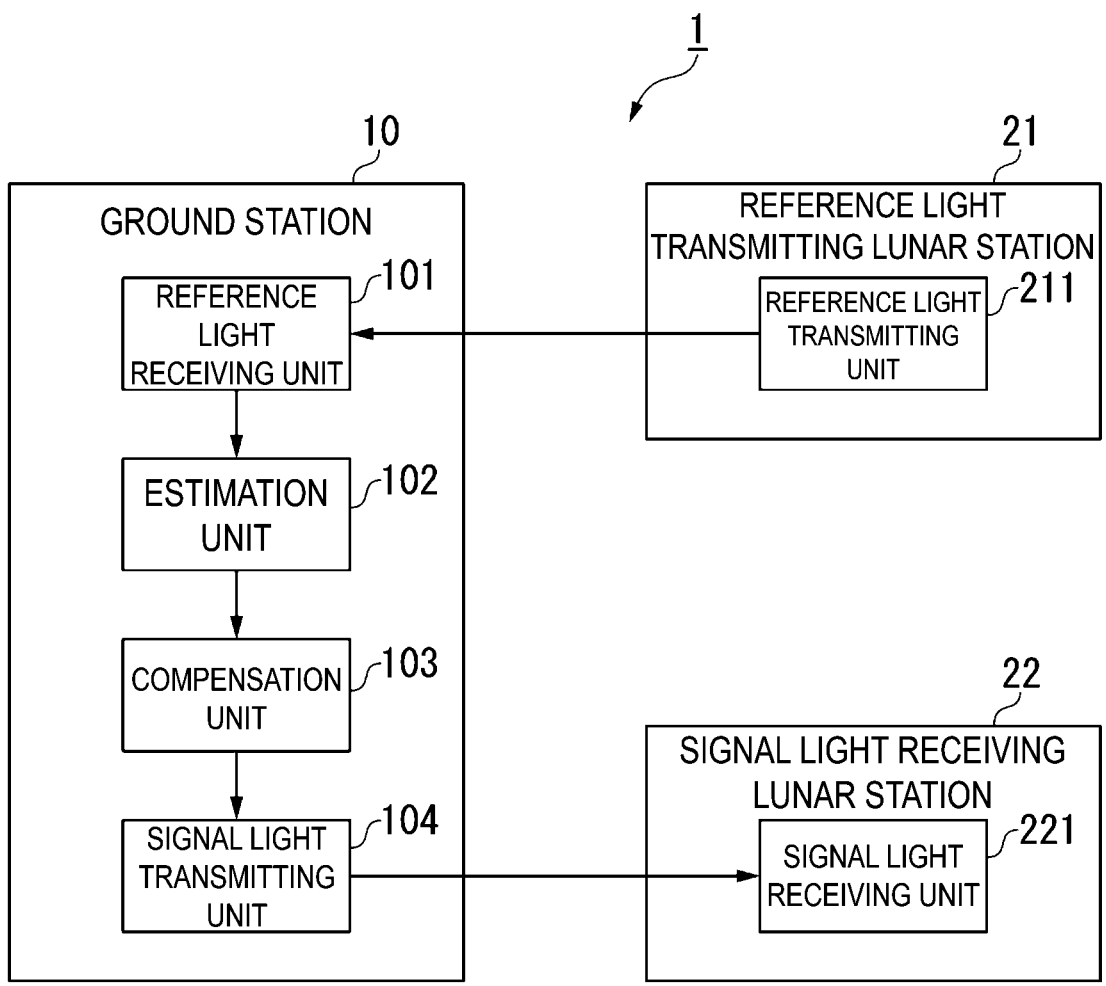
FIG. 3 is a block diagram illustrating functional configurations of the optical wireless communication system 1 according to the first embodiment of the present disclosure.

FIG. 3 is a block diagram illustrating functional configurations of the optical wireless communication system 1 according to the first embodiment of the present disclosure. The optical wireless communication system 1 includes the ground station 10, the reference light transmitting lunar station 21, and the signal light receiving lunar station 22.

The ground station 10 is an optical wireless station designed to perform communication with the reference light transmitting lunar station 21 and the signal light receiving lunar station 22. The ground station 10 is an optical wireless station placed on the ground. Note that the ground station 10 may be placed at any location other than the ground (on the sea, for example) as long as it is placed inside the atmosphere. As illustrated in FIG. 3, the ground station 10 includes a reference light receiving unit 101 (a reference light receiver), an estimation unit 102 (an estimator), a compensation unit 103 (a compensator), and a signal light transmitting unit 104 (a signal light transmitter).

The reference light receiving unit 101 receives the reference light transmitted from the reference light transmitting lunar station 21.

The estimation unit 102 estimates an influence of the atmospheric air (an influence of atmospheric turbulence, for example) on transmission of the signal light based on the reception state of the reference light received by the reference light receiving unit 101. Note that the reception state described here is a spatial intensity difference (speckle) of the reference light caused by an influence of the atmospheric air.

The compensation unit 103 performs compensation processing on the signal light that is to be back-propagated in the arrival direction of the reference light based on the influence of the atmospheric air (an influence of the atmospheric turbulence, for example) estimated by the estimation unit 102.

The signal light transmitting unit 104 transmits the signal light, on which the compensation processing has been performed in advance by the compensation unit 103, in the arrival direction of the reference light.

The reference light transmitting lunar station 21 is an optical wireless station designed to perform communication for transmitting the reference light to the ground station 10. The reference light transmitting lunar station 21 is an optical wireless station placed on the moon surface. Note that the reference light transmitting lunar station 21 may be placed at any location or object (a satellite or the like located in the sky above the moon, for example) as long as it is located on or near the object moving at a constant cycle outside the atmosphere. Moreover, the object may not be the moon.

The reference light transmitting lunar station 21 is placed in front of the position where the signal light receiving lunar station 22 is placed along the traveling direction of the revolution orbit of the moon. The reference light transmitting lunar station 21 is placed at a distance (about 2.59 km, for example) by which the moon moves in the round-trip propagation time in front of the position where the signal light receiving lunar station 22 is placed. Note that the actual round-trip propagation time is a time obtained by adding the processing time at the ground station 10 and the like to the time required for the light to make a round trip between the Earth and the moon as described above. Thus, the distance by which the moon moves in the round-trip propagation time is typically longer than about 2.59 km. In practice, the position where the reference light transmitting lunar station 21 is placed is defined in consideration of the processing time at the ground station 10 and the like.

As illustrated in FIG. 3, the reference light transmitting lunar station 21 includes a reference light transmitting unit 211 (a reference light transmitter). The reference light transmitting unit 211 transmits the reference light to the ground station 10 with the position of itself, which is the position in front in the moving direction of the signal light receiving lunar station 22 (that is, in front in the moving direction of the moon), defined as a transmission position.

The signal light receiving lunar station 22 is an optical wireless station designed to perform communication for receiving the signal light transmitted from the ground station 10. The signal light receiving lunar station 22 is an optical wireless station placed on the lunar surface. Note that the signal light receiving lunar station 22 may be placed at any location or object (a satellite or the light located in the sky above the moon, for example) as long as it is located on or near an object moving at a constant cycle outside the atmosphere. Moreover, the object may not be the moon.

The signal light receiving lunar station 22 is placed behind the position where the reference light transmitting lunar station 21 is placed along the traveling direction of the revolution orbit of the moon. The signal light receiving lunar station 22 is placed at a distance (about 2.59 km, for example) by which the moon moves in the round-trip propagation time behind the position where the reference light transmitting lunar station 21 is placed. Note that the actual round-trip propagation time is a time obtained by adding the processing time at the ground station 10 and the like to the time required for the light to make a round trip between the Earth and the moon as described above. Thus, the distance by which the moon moves in the round-trip propagation time is typically longer than about 2.59 km. In practice, the position where the signal light receiving lunar station 22 is placed is defined in consideration of the processing time at the ground station 10 and the like as well.

As illustrated in FIG. 3, the signal light receiving lunar station 22 includes a signal light receiving unit 221. The signal light receiving unit 221 receives signal light transmitted from the ground station 10.

Note that the reference light transmitting lunar station 21 and the signal light receiving lunar station 22 may be integrated as long as the reference light transmitting unit 211 and the signal light receiving unit 221 are placed at positions separated from each other by the distance by which the moon moves in the propagation time (2.59 km, for example) along the revolution orbit of the moon.

Figure 4:
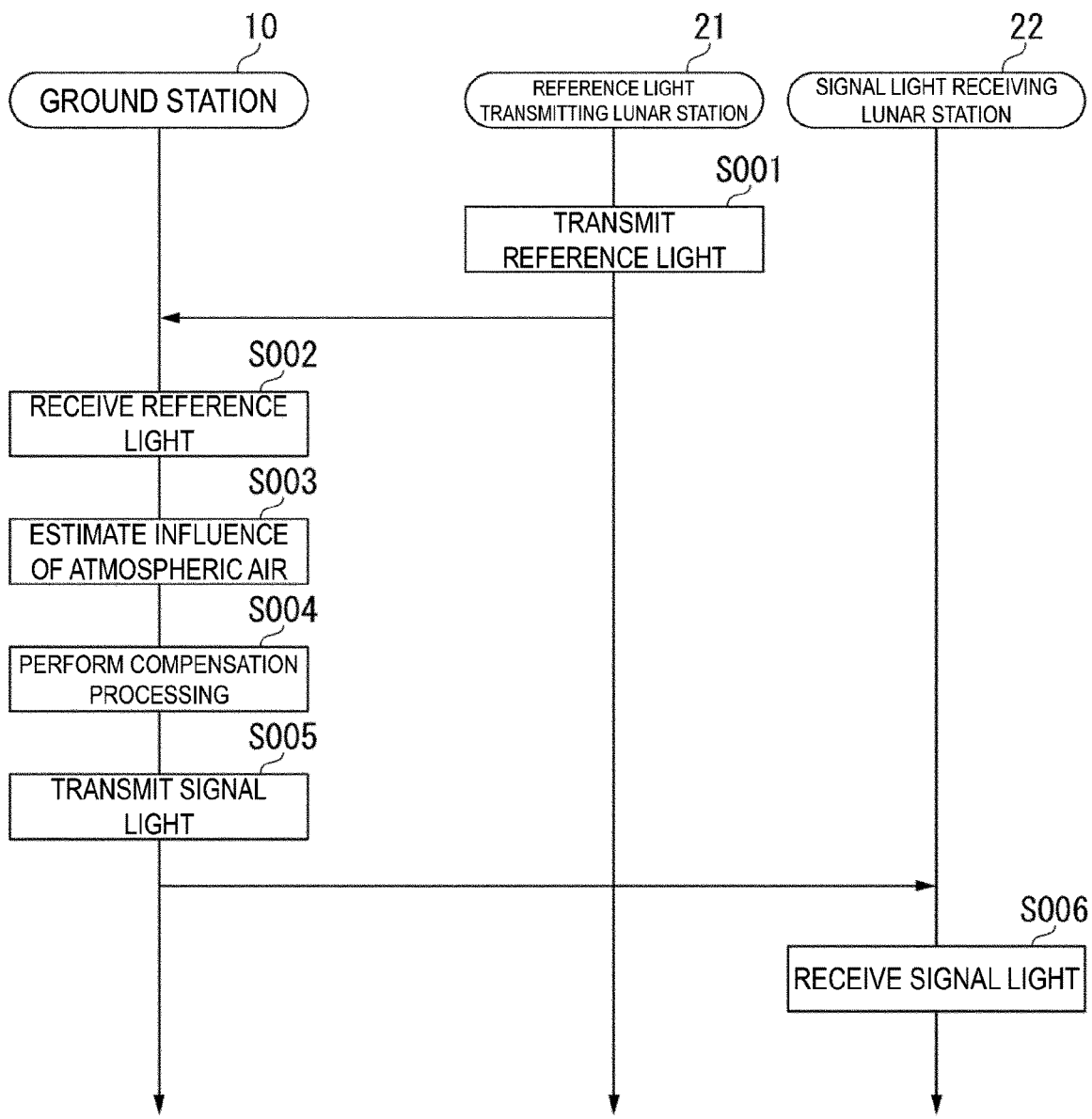
FIG. 4 is a flowchart illustrating operations of the optical wireless communication system 1 according to the first embodiment of the present disclosure.

Operations of Optical Wireless Communication System
Hereinafter, operations of the optical wireless communication system 1 will be described. FIG. 4 is a flowchart illustrating operations of the optical wireless communication system 1 according to the first embodiment of the present disclosure. The flowchart is started at a timing when the ground station 10 can perform communication with the reference light transmitting lunar station 21 and the signal light receiving lunar station 22, for example.

The reference light transmitting unit 211 of the reference light transmitting lunar station 21 transmits the reference light to the ground station 10 with the position of itself, which is the position in front in the moving direction of the signal light receiving lunar station 22 (that is, the position in front in the moving direction of the moon), defined as a transmission position (Step S001).

The reference light receiving unit 101 of the ground station 10 receives the reference light transmitted from the reference light transmitting lunar station 21 (Step S002). The estimation unit 102 of the ground station 10 estimates an influence of the atmospheric air (an influence of atmospheric turbulence, for example) on the transmission of the signal light based on the reception state of the reference light received by the reference light receiving unit 101 (Step S003). The compensation unit 103 of the ground station 10 performs the compensation processing on the signal light that is to be back-propagated in the arrival direction of the reference light based on the influence of the atmospheric air (an influence of atmospheric turbulence, for example) estimated by the estimation unit 102 (Step S004). The signal light transmitting unit 104 of the ground station 10 transmits the signal light on which the compensation processing has been performed in advance by the compensation unit 103 in the arrival direction of the reference light (Step S005).

The signal light receiving unit 221 of the signal light receiving lunar station 22 receives the signal light transmitted from the ground station 10 (Step S006).

The operations of the optical wireless communication system 1 illustrated by the flowchart in FIG. 4 end hitherto.

As described above, the optical wireless communication system 1 according to the first embodiment causes the reference light transmitting lunar station 21 placed in front of the signal light receiving lunar station 22 to transmit the reference light in consideration that the moon moves in the round-trip propagation time. The reference light transmitting lunar station 21 is placed at a distance by which the signal light receiving lunar station 22 moves in the round-trip propagation time in front of the signal light receiving lunar station 22 along the revolution orbit of the moon. In this manner, the optical wireless communication system 1 can curb communication deterioration due to deviation of a light irradiation point along with movement of the signal light receiving lunar station 22 in the round-trip propagation time. Thus, the optical wireless communication system 1 can more stably secure a high light reception level of the signal light at the signal light receiving lunar station 22.

Second Embodiment

Hereinafter, a second embodiment according to the present disclosure will be described. The optical wireless communication system 1 according to the first embodiment described above has a configuration on the assumption that the distance between the transmitting station and the opposing station is fixed. As described above, the distance between the Earth and the moon is assumed to be about 380,000 km in the first embodiment. The configuration of the optical wireless communication system 1 in the first embodiment is a configuration that is particularly effective in a case in which the distance between the transmitting station and the opposing station is fixed.

Figure 5:
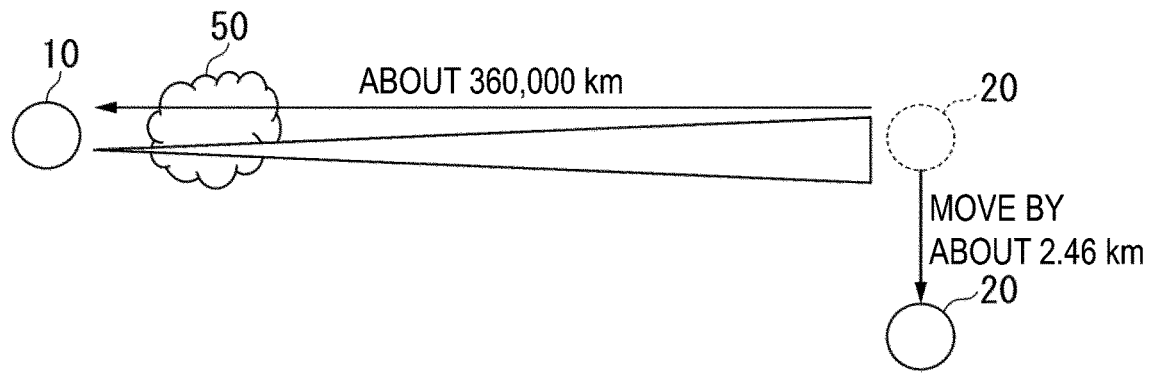
FIG. 5 is a schematic view illustrating movement of a lunar station in a round-trip propagation time.
Figure 6:
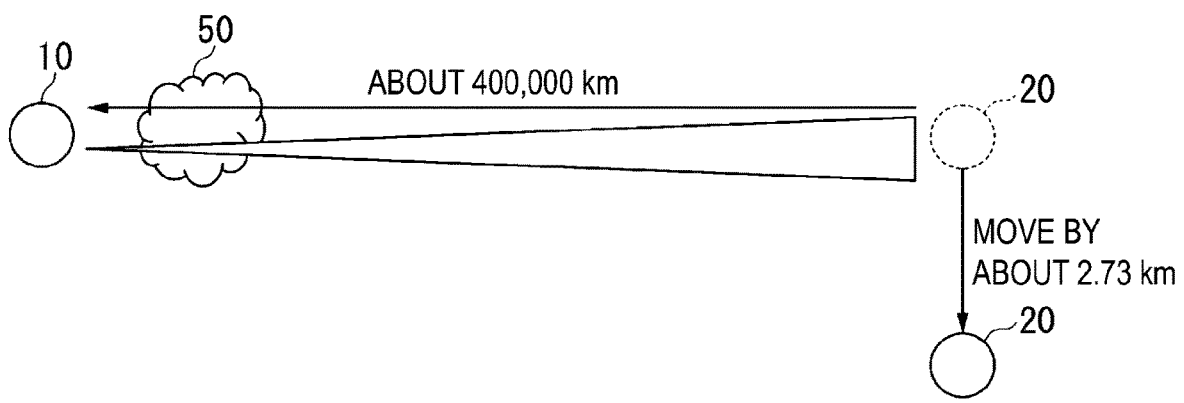
FIG. 6 is a schematic view illustrating movement of the lunar station in the round-trip propagation time.

However, the revolution orbit of the moon has an oval shape. Thus, the distance between the Earth and the moon constantly changes. FIGS. 5 and 6 are schematic views illustrating movement of the lunar station in the round-trip propagation time. FIGS. 5 and 6 each illustrate the ground station 10 and the lunar stations 20. As for the lunar station 20, two lunar stations, namely the lunar station 20 depicted by a solid line circle and the lunar station 20 depicted by a dashed line are illustrated. The lunar station 20 depicted by the dashed line represents the position of the lunar station 20 at a timing when the lunar station 20 transmits the reference light to the ground station 10 (that is, a transmission point of the reference light). On the other hand, the lunar station 20 depicted by the solid line represents the position of the lunar station 20 at a timing when the signal light transmitted from the ground station 10 arrives at the transmission point of the reference light. Also, the atmospheric air 50 of the Earth is present around the ground station 10, and atmospheric turbulence occurs.

Because the revolution orbit of the moon has an oval shape as described above, the distance between the Earth and the moon constantly changes within a range of about 360,000 km and about 400,000 km. In other words, FIG. 5 illustrates movement of the lunar station at a timing at which the Earth and the moon are closest, and FIG. 6 illustrates movement of the lunar station at a timing at which the Earth and the moon are farthest.

With the change in distance between the Earth and the moon, the round-trip propagation time also constantly changes. Moreover, the distance by which the moon moves in the round-trip propagation time also constantly changes due to the change in the round-trip propagation time. As illustrated in FIGS. 5 and 6, the distance by which the moon moves in the round-trip propagation time constantly changes within a range of about 2.46 km and about 2.73 km. Thus, if the signal light is transmitted on the assumption that the distance between the reference light transmitting unit 211 and the signal light receiving unit 221 is always fixed to 2.59 km as in the first embodiment as described above, the signal light reception level at the signal light receiving unit 221 is expected to decrease depending on a time slot.

In the optical wireless communication system according to the second embodiment described below, the transmission point of the reference light transmitted from the reference light transmitting lunar station is virtually changed in consideration of a change in distance by which the moon moves in the round-trip propagation time. In this manner, the optical wireless communication system can more stably secure a high light reception level of the signal light at the lunar station.

Hereinafter, a method of virtually changing the transmission point of the reference light transmitted from the reference light transmitting lunar station will be described. The reference light transmitting lunar station 21 according to the second embodiment changes the transmission point of the reference light using a plurality of reference light transmitting units 211 (211-1 to 211-N) (N is an integer equal to or greater than two).

Figure 7:
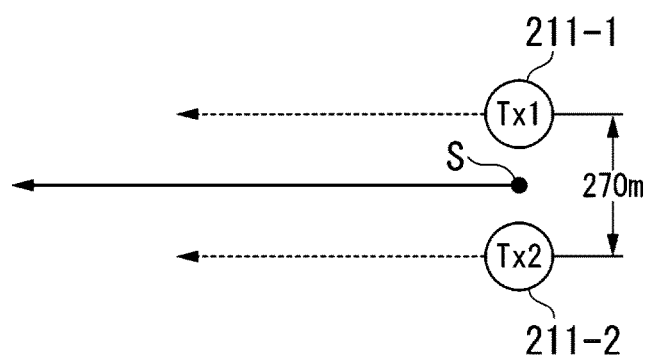
FIG. 7 is a diagram for describing a method of virtually changing a transmission point of reference light.
Figure 8:
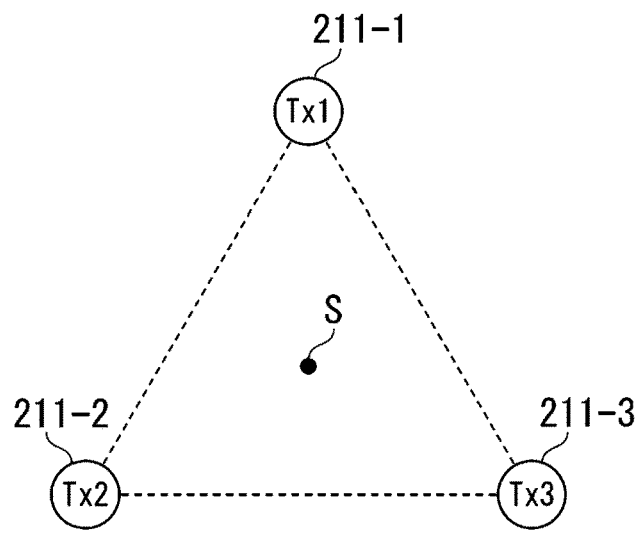
FIG. 8 is a diagram for describing a method of virtually change the transmission point of the reference light.

FIGS. 7 and 8 are diagrams for describing a method of virtually changing the transmission point of the reference light.

FIG. 7 is a diagram illustrating a case in which two reference light transmitting units 211 (211-1 and 211-2) are used. The reference light transmitting lunar station 21 dynamically changes the position of a virtual transmission point S of the reference light when seen from the ground station 10 by changing an output ratio between the reference light transmitted from the reference light transmitting unit 211-1 and the reference light transmitted from the reference light transmitting unit 211-2.

In a case in which the output ratio between the reference light transmitted from the reference light transmitting unit 211-1 and the reference light transmitted from the reference light transmitting unit 211-2 is assumed to be 1:1, for example, an intermediate point between the transmission point of the reference light transmitted from the reference light transmitting unit 211-1 and the transmission point of the reference light transmitted from the reference light transmitting unit 211-2 (the position of the virtual transmission point S in FIG. 7) is the position of the virtual transmission point S of the reference light when seen from the ground station 10.

In a case in which the two reference light transmitting units 211 (211-1 and 211-2) are used, the reference light transmitting unit 211-1 and the reference light transmitting unit 211-2 are aligned and disposed along the revolution orbit of the moon. Also, the position of one of the reference light transmitting units 211 (the reference light transmitting unit 211-1, for example) is placed at about 2.46 km in front of the position where the signal light receiving lunar station 22 is placed. As described above, the distance of about 2.46 km is a distance by which the moon moves in the round-trip propagation time at the timing at which the distance between the Earth and the moon is the shortest. Note that the actual round-trip propagation time is a time obtained by adding the processing time at the ground station 10 and the like to the time required for the light to make a round trip between the Earth and the moon as described above. Thus, the distance by which the moon moves in the round-trip propagation time is typically longer than about 2.46 km. In practice, the position of one of the reference light transmitting units 211

(the reference light transmitting unit 211-1, for example) is defined in consideration of the processing time at the ground station 10 and the like.

Also, the position of the other reference light transmitting unit 211 (the reference light transmitting unit 211-2, for example) is placed at about 2.73 km in front of the position where the signal light receiving lunar station 22 is placed. As described above, the distance of about 2.73 km is a distance by which the moon moves in the round-trip propagation time at the timing when the distance between the Earth and the moon is the longest. Note that the actual round-trip propagation time is a time obtained by adding the processing time at the ground station 10 and the like to the time required for the light to make a round trip between the Earth and the moon as described above. Thus, the distance by which the moon moves in the round-trip propagation time is typically longer than about 2.73 km. In practice, the position of the other reference light transmitting unit 211 (the reference light transmitting unit 211-2, for example) is defined in consideration of the processing time at the ground station 10 and the like as well. As described above, the distance between the reference light transmitting unit 211-1 and the reference light transmitting unit 211-2 is 2.73 km-2.46 km=270 m as illustrated in FIG. 7.

In the aforementioned case, the signal light receiving lunar station 22 can stably receive the signal light by performing control such that the position of the reference light transmitting unit 211-1 is defined as the transmission point of the reference light at the timing when the distance between the Earth and the moon is the shortest. Moreover, the signal light receiving lunar station 22 can stably receive the signal light by performing control such that the position of the reference light transmitting unit 211-2 is defined as the transmission point of the reference light at the timing when the distance between the Earth and the moon is the longest. At a timing other than the aforementioned timings, the signal light receiving lunar station 22 can stably receive the signal light by performing control such that an appropriate position between the position of the reference light transmitting unit 211-1 and the position of the reference light transmitting unit 211-2 is defined as a transmission point of the reference light.

The reference light transmitting lunar station 21 in the second embodiment regularly calculates the round-trip propagation time, and dynamically changes the output ratio of the reference light transmitted from each of the plurality of reference light transmitting units 211 (211-1 to 211-N) in accordance with the calculated round-trip propagation time.

As described above, in a case in which the two reference light transmitting units 211 (211-1 and 211-2) are used, the position of the virtual transmission point of the reference light can be controlled within a range of a line segment connecting the reference light transmitting unit 211-1 and the reference light transmitting unit 211-2. Moreover, in a case in which the three or more reference light transmitting units 211 (211-1 to 211-N) (N is an integer equal to or greater than three) are used, the position of the virtual transmission point of the reference light can be controlled in a planar manner (in a two-dimensional manner). It is possible to control the position of the virtual transmission point of the reference light in a planar manner (in a two-dimensional manner) and thus to more stably receive the signal light at the signal light receiving lunar station 22.

FIG. 8 is a diagram illustrating a case in which three reference light transmitting units 211 (211-1, 211-2, and 211-3) are used. As illustrated in FIG. 8, the three reference light transmitting units 211 (211-1, 211-2, and 211-3) are placed at equal distances from each other in one example. The reference light transmitting lunar station 21 changes the position of the virtual transmission point S of the reference light when seen from the ground station 10 by changing the output ratio of the reference light transmitted from the reference light transmitting unit 211-1, the reference light transmitted from the reference light transmitting unit 211-2, and the reference light transmitted from the reference light transmitting unit 211-3.

In a case in which the output ratio of the reference light transmitted from the reference light transmitting unit 211-1, the reference light transmitted from the reference light transmitting unit 211-2, and the reference light transmitted from the reference light transmitting unit 211-3 is assumed to be 1:1:1, for example, a position at equal distances from the position of the transmission point of the reference light transmitted from the reference light transmitting unit 211-1, the position of the transmission point of the reference light transmitted from the reference light transmitting unit 211-2, and the position of the transmission point of the reference light transmitted from the reference light transmitting unit 211-3 (the position of the virtual transmission point S in FIG. 8) is defined as the position of the virtual transmission point S of the reference light when seen from the ground station 10.

The range of the triangle illustrated by the dashed line in FIG. 8 is the range in which the virtual transmission point S of the reference light can be positioned in the case in which the three reference light transmitting units 211 (211-1, 211-2, and 211-3) are used. It is only necessary that the positions where the three reference light transmitting units 211 (211-1, 211-2, and 211-3) are placed be determined such that the arrival point of the signal light at the timing when the distance between the Earth and the moon is the shortest and the arrival point of the signal light at the timing when the distance between the Earth and the moon is the longest fall within the range of the triangle.

Functional Configurations of Reference Light Transmitting Lunar Station Hereinafter, functional configurations of a reference light transmitting lunar station will be described.

Figure 9:
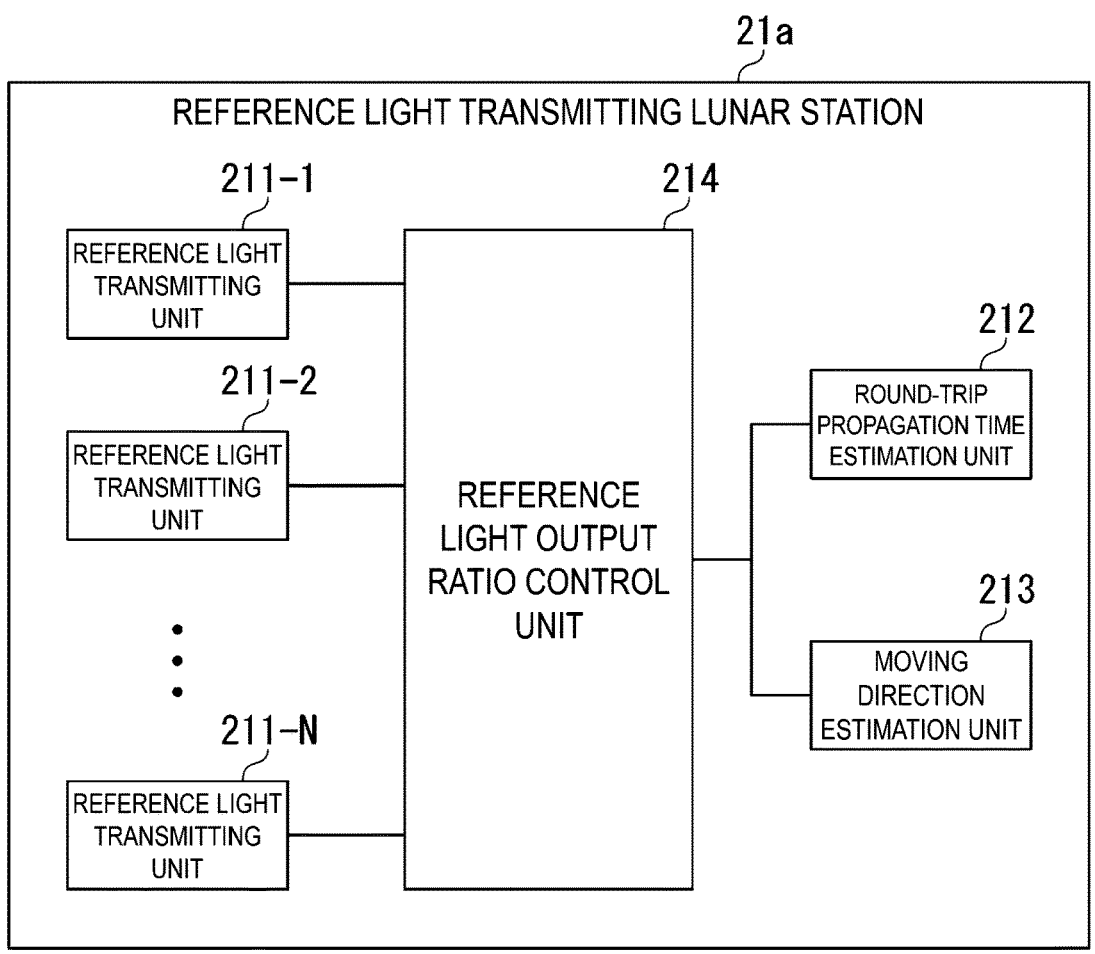
FIG. 9 is a block diagram illustrating functional configurations of a reference light transmitting lunar station 21a according to a second embodiment of the present disclosure.

FIG. 9 is a block diagram illustrating functional configurations of a reference light transmitting lunar station 21a according to the second embodiment of the present disclosure. As illustrated in FIG. 9, the reference light transmitting lunar station 21a includes a plurality of reference light transmitting units 211 (211-1 to 211-N) (N is an integer equal to or greater than two), a round-trip propagation time estimation unit 212 (a round-trip propagation time estimator), a moving direction estimation unit 213 (a moving direction estimator), and a reference light output ratio control unit 214 (a reference light output ratio controller).

The reference light transmitting units 211 (211-1 to 211-N) transmit the reference light to the ground station 10 under output control performed by the reference light output ratio control unit 214.

The round-trip propagation time estimation unit 212 estimates a round-trip propagation time of the light (reference light and signal light) between the ground station 10 and the lunar stations (the reference light transmitting lunar station 21a and the signal light receiving lunar station 22). The round-trip propagation time estimation unit 212 outputs a result of the estimation to the reference light output ratio control unit 214. Note that it is possible to use any method in the related art as a method of estimating the round-trip propagation time. Note that an example of the method of estimating the round-trip propagation time will be described later.

The moving direction estimation unit 213 estimates the moving direction of the moon (that is, the moving direction of the signal light receiving lunar station 22). The moving direction estimation unit 213 outputs a result of the estimation to the reference light output ratio control unit 214. Note that it is possible to use any method in the related art as the method of estimating the moving direction of the moon.

The reference light output ratio control unit 214 controls the output ratio of the reference light at the plurality of reference light transmitting units 211 (211-1 to 211-N) based on the round-trip propagation time estimated by the round-trip propagation time estimation unit 212 and the moving direction of the moon estimated by the moving direction estimation unit 213 (that is, the moving direction of the signal light receiving lunar station 22).

Hereinafter, an example of a hardware configuration of the reference light output ratio control unit 214 will be described.

Figure 10:
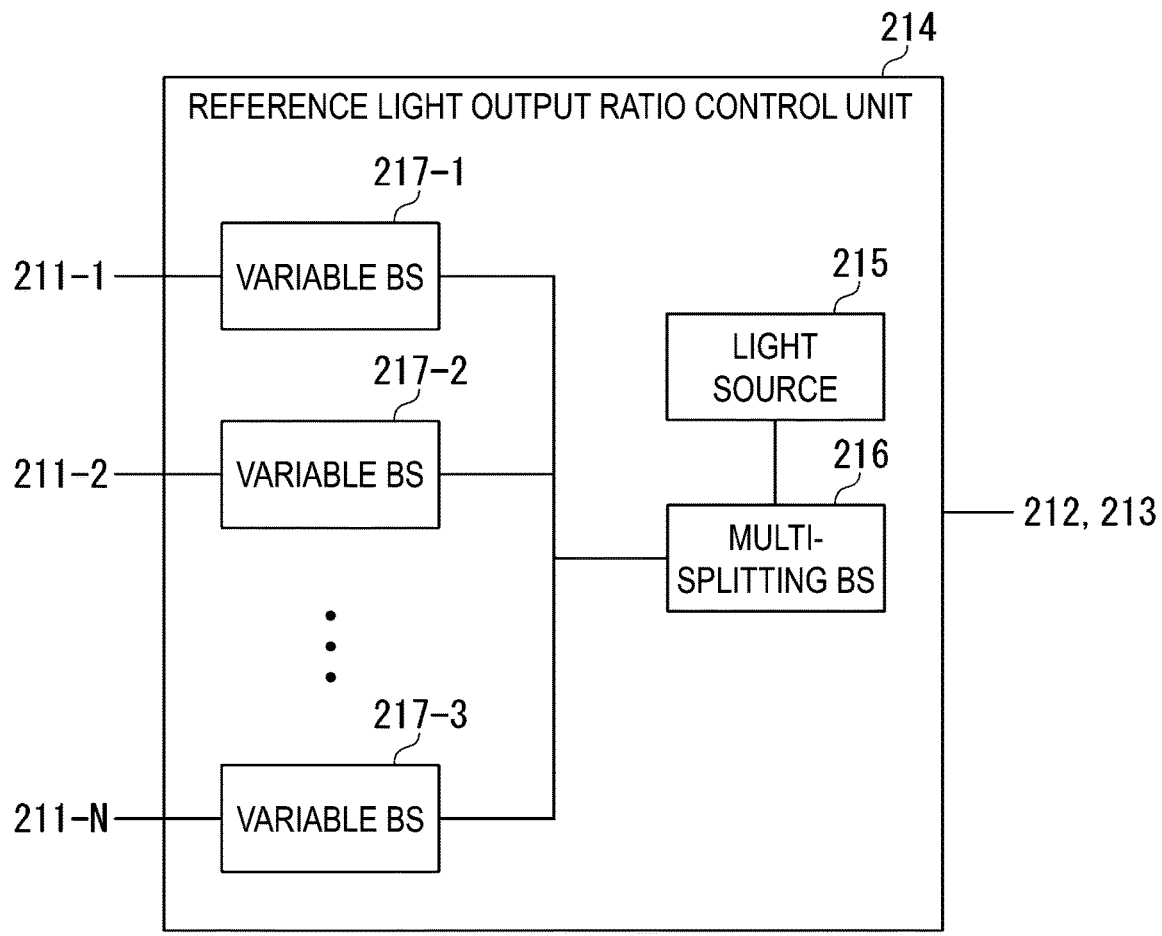
FIG. 10 is a block diagram illustrating a hardware configuration of a reference light output ratio control unit 214 according to the second embodiment of the present disclosure.

FIG. 10 is a block diagram illustrating a hardware configuration of the reference light output ratio control unit 214 according to the second embodiment of the present disclosure. As illustrated in FIG. 10, the reference light output ratio control unit 214 is configured to include a light source 215, a multi-splitting beam splitter 216 (hereinafter, referred to as a "multi-splitting BS 216"), a plurality of variable beam splitters 217 (217-1 to 217-N) (N is an integer equal to or greater than two) (hereinafter, referred to as "variable BSs 217 (217-1 to 217-N)").

The light source 215 is a light source of reference light transmitted to the ground station 10.

The multi-splitting BS 216 splits the reference light output from the light source 215 into a plurality of reference light beams. Specifically, the multi-splitting BS 216 equally distributes the reference light output from the light source 215 into N light beams. N is the number of the variable BSs 217. The multi-splitting BSs 216 output the equally distributed reference light beams to the plurality of variable BSs 217 (217-1 to 217-N).

Each variable BS 217 (217-1 to 217-N) changes transmittance of the reference light input from the multi-splitting BS 216. Here, the reference light output ratio control unit 214 controls the output ratio of the reference light output from each of the plurality of variable BSs 217 (217-1 to 217-N) by controlling the transmittance of the reference light at each of the plurality of variable BSs 217 (217-1 to 217-N) based on the round-trip propagation time estimated by the round-trip propagation time estimation unit 212 and the moving direction of the moon estimated by the moving direction estimation unit 213 (that is, the moving direction of the signal light receiving lunar station 22). Each of the plurality of variable BSs 217 (217-1 to 217-N) outputs the reference light to a corresponding one of the plurality of reference light transmitting units 211 (211-1 to 211-N).

Hereinafter, arrangement of the light source 215 and the plurality of reference light transmitting units 211 (211-1 to 211-N) will be described. The light source 215 and the plurality of reference light transmitting units 211 (211-1 to 211-N) are disposed such that the optical path lengths from the light source 215 to the reference light transmitting units 211 (phase rotation amounts) become equal to each other.

Figure 11:
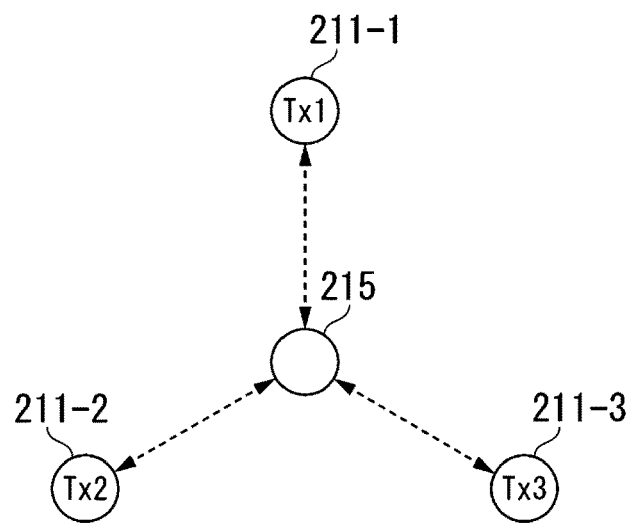
FIG. 11 is a diagram illustrating an arrangement example of a light source 215 and a plurality of reference light transmitting units 211 according to the second embodiment of the present disclosure.

FIG. 11 is a diagram illustrating an arrangement example of the light source 215 and the plurality of reference light transmitting units 211 according to the second embodiment of the present disclosure. FIG. 11 illustrates an arrangement example in a case in which three reference light transmitting units 211 are provided.

As illustrated in FIG. 11, the three reference light transmitting units 211 (211-1 to 211-3) are disposed at mutually equal distances. Also, the light source 215 is disposed at the center of the three reference light transmitting units 211 (211-1 to 211-3). The reference light output from the light source 215 is incident on the plurality of reference light transmitting units 211 (211-1 to 211-3) via the multi-splitting BS 216 and the plurality of variable BSs 217 (217-1 to 217-N) described above. Each of the reference light transmitting units 211 (211-1 to 211-3) reflects the incident reference light to the direction of the ground station 10.

Hereinafter, an example of the method of estimating the round-trip propagation time performed by the round-trip propagation time estimation unit 212 will be described.

First, the following method can be used as the method for estimating the round-trip propagation time using the light transmitted from the lunar station, for example. The lunar station transmits the light to the Earth, and the light is reflected by the retroreflector placed on the Earth. The lunar station estimates the round-trip propagation time through observation of the reflected light. As the light transmitted by the lunar station, it is possible to use a pulse laser, for example. The lunar station can estimate the round-trip propagation time based on a difference between a clock time when an optical pulse reflected by the retroreflector and arriving therefrom is received and a clock time when the optical pulse is transmitted.

Also, the following method may be used as a method that does not use a pulse laser, for example. The lunar station performs a cross-correlation operation between the light transmitted to the Earth and the light reflected by the retroreflector and arriving therefrom. The lunar station can estimate the round-trip propagation time based on a difference between a clock time at the peak position obtained from the cross-correlation operation and a clock time at which the light is transmitted.

Also, the following method can be used as another method for estimating the round-trip propagation time using the light transmitted from the lunar station, for example. First, a GPS satellite of the moon that is clock-synchronized with a global positioning system (GPS) satellite of the Earth distributes clock time information to the lunar station. In a state in which the ground station and the lunar station are clock-synchronized, the lunar station transmits light to the ground station at a predetermined clock time or at predetermined intervals. The ground station can estimate the round-trip propagation time by measuring the propagation time for one way from the lunar station to the ground station based on the light receiving clock time and calculating a time which is a double of the measured propagation time. The ground station transmits the result of the estimation to the lunar station using low-speed wireless communication. Using the low-speed wireless communication enables the ground station to avoid the influence of atmospheric turbulence without performing the compensation processing on the influence of the atmospheric turbulence and to transmit the estimation result to the lunar station.

On the other hand, it is possible to use the following method as a method for estimating the round-trip propagation time using the light transmitted from the Earth, for example. First, the GPS satellite of the moon that is clock-synchronized with the GPS satellite of the Earth distributes clock time information to the lunar station. In a state in which the ground station and the lunar station are clock-synchronized, the ground station transmits light to the lunar station at a predetermined time or at predetermined intervals. The lunar station can estimate the round-trip propagation time by measuring the propagation time for one way from the ground station to the lunar station based on the light receiving clock time and calculating a time which is a double of the measured propagation time.

Also, the following method can be used as another method for estimating the round-trip propagation time using the light transmitted from the Earth, for example. The ground station transmits the light to the moon and causes the retroreflector placed on the moon surface to reflect the light. The ground station estimates the round-trip propagation time through observation of the reflected light. It is possible to use a pulse laser, for example, as light transmitted by the ground station. The ground station can estimate the round-trip propagation time based on a difference between the clock time when the optical pulse reflected by the retroreflector and arriving therefrom is received and the clock time when the optical pulse is transmitted. The ground station transmits the result of the estimation to the lunar station using low-speed wireless communication. Using the low-speed wireless communication enables the ground station to avoid the influence of atmospheric turbulence without performing the compensation processing on the influence of the atmospheric turbulence and to transmit the estimation result to the lunar station.

Operations of Optical Wireless Communication System

Hereinafter, operations of the optical wireless communication system according to the present embodiment will be described.

Figure 12:
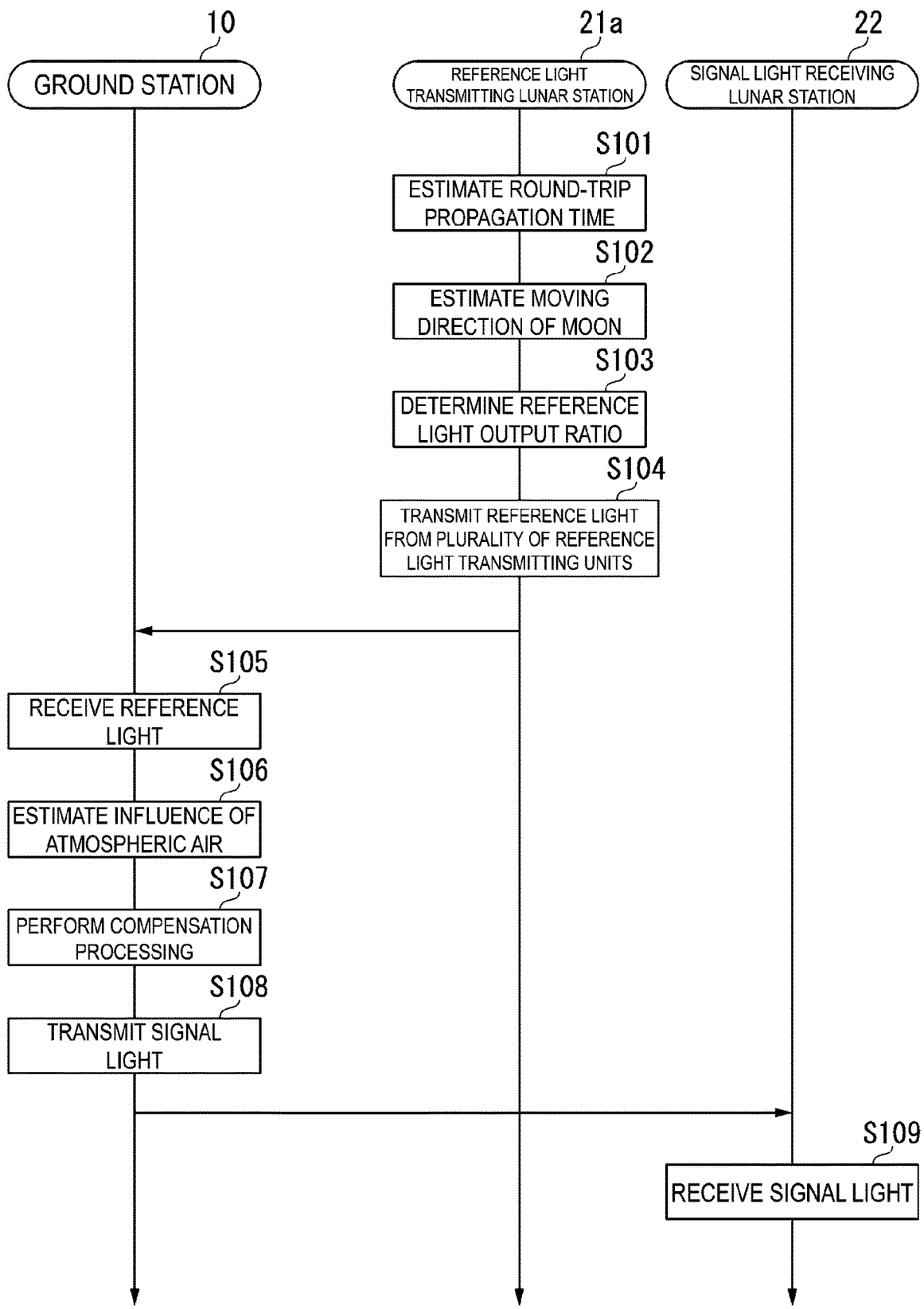
FIG. 12 is a flowchart illustrating operations of an optical wireless communication system according to the second embodiment of the present disclosure.

FIG. 12 is a flowchart illustrating operations of the optical wireless communication system according to the second embodiment of the present disclosure. The flowchart is started at a timing at which the ground station 10 can perform communication with the reference light transmitting lunar station 21*a* and the signal light receiving lunar station 22, for example.

The round-trip propagation time estimation unit 212 of the reference light transmitting lunar station 21*a* estimates the round-trip propagation time of the light (reference light and signal light) between the ground station 10 and the lunar stations (the reference light transmitting lunar station 21*a* and the signal light receiving lunar station 22) (Step S101). The moving direction estimation unit 213 of the reference light transmitting lunar station 21*a* estimates the moving direction of the moon (that is, the moving direction of the signal light receiving lunar station 22) (Step S102).

The reference light output ratio control unit 214 of the reference light transmitting lunar station 21*a* determines an output ratio of the reference light at the plurality of reference light transmitting units 211 (211-1 to 211-N) based on the round-trip propagation time estimated by the round-trip propagation time estimation unit 212 and the moving direction of the moon estimated by the moving direction estimation unit 213 (that is, the moving direction of the signal light receiving lunar station 22) (Step S103).

The plurality of reference light transmitting units 211 (211-1 to 211-N) of the reference light transmitting lunar station 21*a* transmit the reference light to the ground station 10 based on the output ratio determined by the reference light output ratio control unit 214 (Step S104).

The reference light receiving unit 101 of the ground station 10 receives the reference light transmitted from the reference light transmitting lunar station 21*a* (Step S105). The estimation unit 102 of the ground station 10 estimates an influence of the atmospheric air (an influence of the atmospheric turbulence, for example) on the transmission of the signal light based on the reception state of the reference light received by the reference light receiving unit 101 (Step S106). The compensation unit 103 of the ground station 10 performs compensation processing on the signal light to be back-propagated in the arrival direction of the reference light based on the influence of the atmospheric air (the influence of the atmospheric turbulence, for example) estimated by the estimation unit 102 (Step S107). The signal light transmitting unit 104 of the ground station 10 transmits the signal light on which the compensation processing has been performed in advance by the compensation unit 103 in the arrival direction of the reference light (Step S108).

The signal light receiving unit 221 of the signal light receiving lunar station 22 receives the signal light transmitted from the ground station 10 (Step S109).

The operations of the optical wireless communication system illustrated in the flowchart in FIG. 12 ends hitherto.

Note that the optical wireless communication system periodically repeats the operations illustrated in the flowchart in FIG. 12. The optical wireless communication system can more accurately follow the position of the virtual transmission point of the reference light in accordance with changes in moving distance and moving direction of the moon along with the revolution of the moon by periodically estimating the round-trip propagation time of the light between the Earth and the moon and the moving direction of the moon and changing the output ratio of the reference light as needed based on the result of the estimation.

In particular, in a case in which the optical wireless communication from the ground station to the lunar station is performed for a long period of time, and the light irradiation point shift of the signal light associated with the movement of the lunar station during the round-trip propagation time is corrected at a high frequency to stabilize communication quality, the optical wireless communication system repeats the operations illustrated in the flowchart in FIG. 12 at a higher frequency. It is desirable that the frequency at which the round-trip propagation time of the light between the Earth and the moon and the moving direction of the moon are estimated and the output ratio of the reference light based on the result of the estimation as described above are estimated be appropriately adjusted in accordance with communication quality required.

As described above, the optical wireless communication system according to the second embodiment virtually changes the transmission point of the reference light transmitted from the reference light transmitting lunar station 21*a* in consideration of a change in distance by which the moon moves in the round-trip propagation time. In this manner, the optical wireless communication system can curb communication deterioration due to deviation of the light irradiation point with movement of the signal light receiving lunar station 22 in the round-trip propagation time. Thus, the optical wireless communication system can more stably secure a high light reception level of the signal light at the signal light receiving lunar station 22.

According to each embodiment described above, the optical wireless communication system includes the optical wireless communication apparatus that moves along the first optical wireless station and the second optical wireless station that is opposed to the first optical wireless station. For example, the optical wireless communication system is an optical wireless communication system 1 according to the embodiment, the first optical wireless station is the signal light receiving lunar station 22 in the embodiments, the optical wireless communication apparatus is the reference light transmitting lunar station 21 in the embodiments, and the second optical wireless station is the ground station 10 in the embodiments.

The optical wireless communication apparatus includes at least one reference light transmitting unit. For example, the reference light transmitting unit corresponds to the reference light transmitting units 211 (211-1 to 211-N) in the embodiments. The reference light transmitting unit transmits the reference light to the second optical wireless station with the position in front in the moving direction of the first optical wireless station defined as the transmission position.

The second optical wireless station includes the reference light receiving unit, the estimation unit, the compensation unit, and the signal light transmitting unit. For example, the reference light receiving unit corresponds to the reference light receiving unit 101 in the embodiments, the estimation unit corresponds to the estimation unit 102 in the embodiments, the compensation unit corresponds to the compensation unit 103 in the embodiments, and the signal light transmitting unit corresponds to the signal light transmitting unit 104 in the embodiments.

The reference light receiving unit receives the reference light transmitted from the reference light transmitting unit. The estimation unit estimates an influence of the atmospheric air on the transmission of the signal light based on the reception state of the reference light received by the reference light receiving unit. For example, the reception state of the reference light is a spatial intensity difference (speckle) of the reference light occurring due to the influence of the atmospheric air in the embodiments, and the influence of the atmospheric air is an influence of the atmospheric turbulence of the Earth in the embodiments. The compensation unit performs the compensation processing on the signal light based on the influence of the atmospheric air estimated by the estimation unit. The signal light transmitting unit transmits the signal light on which the compensation processing has been performed by the compensation unit in the arrival direction of the reference light.

Moreover, the optical wireless communication apparatus may define, as the transmission position, the position in front in the moving direction of the first optical wireless station by the distance by which the first optical wireless station moves in the round-trip propagation time of the light between the first optical wireless station and the second optical wireless station. For example, the light making a round trip is the reference light and the signal light in the embodiments.

Also, the optical wireless communication apparatus may further include a plurality of reference light transmitting units, a round-trip propagation time estimation unit, a moving direction estimation unit, and a reference light output ratio control unit. For example, the plurality of reference light transmitting units correspond to the reference light transmitting units 211-1 to 211-N in the embodiments, the round-trip propagation time estimation unit corresponds to the round-trip propagation time estimation unit 212 in the embodiments, the moving direction estimation unit corresponds to the moving direction estimation unit 213 in the embodiments, and the reference light output ratio control unit corresponds to the reference light output ratio control unit 214 in the embodiments.

The round-trip propagation time estimation unit estimates the round-trip propagation time of the light between the first optical wireless station and the second optical wireless station. The moving direction estimation unit estimates the moving direction of the first optical wireless station. The reference light output ratio control unit controls the output ratio of the reference light at the plurality of reference light transmitting units based on the round-trip propagation time estimated by the round-trip propagation time estimation unit and the moving direction estimated by the moving direction estimation unit.

Also, the round-trip propagation time estimation unit may repeatedly estimate the round-trip propagation time at a given time interval, the moving direction estimation unit may repeatedly estimate the moving direction of the first optical wireless station at the given time interval, and the reference light output ratio control unit may adaptively control the output ratio of the reference light based on the round-trip propagation time and the moving direction repeatedly estimated at the given time intervals.

Also, the reference light output ratio control unit may control the output ratio of the reference light by splitting the reference light output from the light source into a plurality of reference light beams and changing transmittance of each of the plurality of split reference light beams. For example, the light source corresponds to a light source 215 in the embodiment.

Also, the plurality of reference light transmitting units may be disposed such that the optical path lengths from the light source become equal to each other.

The round-trip propagation time estimation unit may estimate the round-trip propagation time based on a result of observing reflected light obtained by transmitting light from an area where the first optical wireless station is located and reflecting the light by the retroreflector placed in an area where the second optical wireless station is located or reflected light obtained by transmitting light from the area where the second optical wireless station is located and reflecting the light by the retroreflector placed in the area where the first optical wireless station is located. For example, the area where the first optical wireless station is located is the moon surface in the embodiments, and the area where the second optical wireless station is located is the ground in the embodiments.

Some or all of the ground station 10, the reference light transmitting lunar station 21 (21a), and the signal light receiving lunar station 22 in each of the aforementioned embodiments may be achieved by computers. In that case, the functions may be implemented by recording a program for implementing the functions in a computer readable recording medium and causing a computer system to read and execute the program recorded in the recording medium. Note that the "computer system" described here is assumed to include an OS and hardware such as a peripheral device. The "computer-readable recording medium" means a portable medium such as a flexible disk, a magneto-optical disk, a ROM, or a CD-ROM or a storage device such as a hard disk incorporated in the computer system. Moreover, the "computer-readable recording medium" may include a recording medium that dynamically holds the program for a short period of time, such as a communication line in a case in which the program is transmitted via a network such as the Internet or a communication line such as a telephone line, or a recording medium that holds the program for a specific period of time, such as a volatile memory inside a computer system that serves as a server or a client in that case. Furthermore, the aforementioned program may be for implementing some of the aforementioned functions, or may be able to implement the aforementioned functions in combination with a program that has already been recorded in the computer system, or using a programmable logic device such as a field programmable gate array (FPGA).

Although the embodiments of the present disclosure have been described above in detail with reference to the drawings, a specific configuration is not limited to the embodiments, and includes designs and the like in a range not departing from the gist of the present disclosure.

REFERENCE SIGNS LIST

1 Optical wireless communication system
10 Ground station
20 Lunar station
21 (21a) Reference light transmitting lunar station
22 Signal light receiving lunar station
50 Atmospheric air
101 Reference light receiving unit
102 Estimation unit
103 Compensation unit
104 Signal light transmitting unit
211 (211-1 to 211-N) Reference light transmitting unit
212 Round-trip propagation time estimation unit
213 Moving direction estimation unit
214 Reference light output ratio control unit
215 Light source
216 Multi-splitting beam splitter
217 (217-1 to 217-N) Variable beam splitter 221 Signal light receiving unit

The invention claimed is:

1. An optical wireless communication system comprising:
an optical wireless communication apparatus configured to move along with a first optical wireless station; and
a second optical wireless station opposed to the first optical wireless station, wherein
the optical wireless communication apparatus includes
at least one reference light transmitter configured to transmit reference light to the second optical wireless station with a position in front in a moving direction of the first optical wireless station defined as a transmission position,
the second optical wireless station includes
a reference light receiver configured to receive the reference light transmitted from the at least one reference light transmitter,
an estimator configured to estimate an influence of atmospheric air on transmission of signal light based on a reception state of the reference light received by the reference light receiver,
a compensator configured to perform compensation processing on the signal light based on the influence of the atmospheric air estimated by the estimator, and
a signal light transmitter configured to transmit the signal light on which the compensation processing has been performed by the compensator in a direction of the transmmission position,
wherein the first optical wireless station is configured to receive the signal light transmitted by the second optical wireless station,
wherein optical wireless communciation apparatus is configured to define, as the transmission position, a position at a distance by which the first optical wireless station moves in a round-trip propagation time of light between the first optical wireless station and the second optical wireless station in front in the moving direction of the first optical wireless station.

2. An optical wireless communication method performed by an optical wireless communication system including an optical wireless communication apparatus configured to move along with a first optical wireless station and a second optical wireless station opposed to the first optical wireless station, the method comprising:

by the optical wireless communication apparatus, transmitting reference light to the second optical wireless station with a position in front in a moving direction of the first optical wireless station defined as a transmission position and defining, as the transmission position, a position at a distance by which the first optical wireless station moves in a round-trip propagation time of light between the first optical wireless station and the second optical wireless station in front in the moving direction of the first optical wireless station;

by the second optical wireless station, receiving the reference light transmitted in the transmitting of the reference light;

by the second optical wireless station, estimating an influence of atmospheric air on transmission of signal light based on a reception state of the reference light received in the receiving of the reference light;

by the second optical wireless station, performing compensation processing on the signal light based on the influence of the atmospheric air estimated in the estimating of the influence; and by the second optical wireless station, transmitting the signal light on which the compensation processing has been performed in the performing of the compensation processing in a direction of the transmission position; and by the first optical wireless station, receiving the signal light transmitted by the second optical wireless station.

3. An optical wireless communication system comprising:
an optical wireless communication apparatus configured to move along with a first optical wireless station; and
a second optical wireless station opposed to the first optical wireless station, wherein
the optical wireless communication apparatus includes
at least one reference light transmitter configured to transmit reference light to the second optical wireless station with a position in front in a moving direction of the first optical wireless station defined as a transmission position,
the second optical wireless station includes
a reference light receiver configured to receive the reference light transmitted from the at least one reference light transmitter,
an estimator configured to estimate an influence of atmospheric air on transmission of signal light based on a reception state of the reference light received by the reference light receiver,
a compensator configured to perform compensation processing on the signal light based on the influence of the atmospheric air estimated by the estimator, and
a signal light transmitter configured to transmit the signal light on which the compensation processing has been performed by the compensator in a direction of the transmmission position,
wherein the first optical wireless station is configured to receive the signal light transmitted by the second optical wireless station,
wherein optical wireless communciation apparatus is configured to define, as the transmission position, a position at a distance by which the first optical wireless station moves in a round-trip propagation time of light between the first optical wireless station and the second optical wireless station in front in the moving direction of the first optical wireless station
wherein the optical wireless communication apparatus further includes a plurality of the reference light transmitters, a round-trip propagation time estimator configured to estimate a round-trip propagation time of light between the first optical wireless station and the second optical wireless station, a moving direction estimator configured to estimate a moving direction of the first optical wireless station, and a reference light output ratio controller configured to control an output ratio of the reference light from the plurality of reference light transmitters based on the round-trip propagation time estimated by the round-trip propagation time estimator and the moving direction estimated by the moving direction estimator.

4. The optical wireless communication system according to claim 3, wherein the round-trip propagation time estimator repeatedly estimates the round-trip propagation time at a given time interval, the moving direction estimator repeatedly estimates the moving direction of the first optical wireless station at the given time interval, and the reference light output ratio controller adaptively controls the output ratio of the reference light based on the round-trip propagation time and the moving direction repeatedly estimated at the given time interval.

5. The optical wireless communication system according to claim 3, wherein the reference light output ratio controller controls the output ratio of the reference light by splitting the reference light output from a light source into a plurality of reference light beams and changing transmittance of each of the plurality of split reference light beams.

6. The optical wireless communication system according to claim 5, wherein the plurality of reference light transmitters are disposed such that optical path lengths from the light source become equal to each other.

7. The optical wireless communication system according to claim 3, wherein the round-trip propagation time estimator estimates the round-trip propagation time based on a result of observing reflected light obtained by transmitting light from an area where the first optical wireless station is located and reflecting the light by a retroreflector placed in an area where the second optical wireless station is located or reflected light obtained by transmitting light from the area where the second optical wireless station is located and reflecting the light by a retroreflector placed in the area where the first optical wireless station is located.

* * * * *